United States Patent
Abebe (10) Patent No.: US 10,206,523 B2
(45) Date of Patent: Feb. 19, 2019

(54) ORGANIZER AND DISPLAY UNIT

(71) Applicant: Tsigie Abebe, Ellicott City, MD (US)

(72) Inventor: Tsigie Abebe, Ellicott City, MD (US)

(*) Notice: Subject to any disclaimer, the term of this patent is extended or adjusted under 35 U.S.C. 154(b) by 0 days.

(21) Appl. No.: 15/706,872

(22) Filed: Sep. 18, 2017

(65) Prior Publication Data

US 2018/0000263 A1 Jan. 4, 2018

Related U.S. Application Data

(63) Continuation-in-part of application No. 15/043,557, filed on Feb. 13, 2016, now Pat. No. 9,763,529.

(Continued)

(51) Int. Cl.
*A47F 5/00* (2006.01)
*A47F 5/08* (2006.01)
(Continued)

(52) U.S. Cl.
CPC .......... *A47F 5/0006* (2013.01); *A47F 5/0815* (2013.01); *A47F 5/0838* (2013.01); *A47F 7/02* (2013.01); *A47F 7/024* (2013.01); *A47G 29/08* (2013.01); *F16B 7/22* (2013.01); *F16B 45/02* (2013.01); *F16B 2001/0035* (2013.01)

(58) Field of Classification Search
CPC ..... A47J 29/00; A47G 29/10; A47G 25/0692; A47G 25/74; A47G 25/0685; A47G 25/005; A47F 7/02; A47F 7/022; A47F 7/024; A47F 5/01; A47F 5/13; A47F 5/14; A47F 5/0006; A47F 7/12; A47F 7/17; A47F 7/19; A47F 5/0807; A47F 3/002; A47F 5/0861; A47F 7/08; A47F 5/0815; A47F 5/0838; A47B 55/02; A47B 61/003; A47B 61/04; A47H 1/02; A47H 2001/021; A47H 2001/0215; A47K 10/04; A47K 10/10; B42F 13/24; B42F 13/12; B42F 13/22; E05B 73/00; E05B 69/006; E05B 69/003; Y10T 403/59; Y10T 403/591; Y10T 24/45319; E05C 17/56; E05C 19/16; E05C 16/168; F16B 45/02; F16B 7/22; F16B 2001/0035
USPC ......... 211/85.2, 175, 181.1, 123, 105.1, 124, 211/89.01, 100, 125, 85.31, 85.5, 85.3, 4, 211/7, 34, 35, 37, 204, 206, 6, 16;
(Continued)

(56) References Cited

U.S. PATENT DOCUMENTS

| 270,134 A | * | 1/1883 | Schmidt | A47B 53/00 16/87.4 R |
| 274,688 A | * | 3/1883 | Wicks | B42F 13/24 402/35 |

(Continued)

*Primary Examiner* — Jennifer E. Novosad
(74) *Attorney, Agent, or Firm* — Michael J. Foycik, Jr.

(57) ABSTRACT

A jewelry organizer, holder and/or display has a beam or beams closed at each end to maintain the items on the holder/display unit. In one form, two paired storage beams or rods are cantilevered to each end of an elongated mounting strip. The open end of each paired rod extends towards the middle of the elongated strip. A pivotable cover in one embodiment or a sliding cover in another embodiment is secured to one of the paired rods and permits the rods to be secured together into a single elongated rod when the cover is in the closed position. When the cover is in the open position, a gap exists between the paired rods permitting continuous items of jewelry to be slipped onto or removed from the storage rods.

6 Claims, 4 Drawing Sheets

Related U.S. Application Data (60) Provisional application No. 62/115,835, filed on Feb. 13, 2015.

(51) Int. Cl.
| | |
|---|---|
| *A47F 7/02* | (2006.01) |
| *F16B 1/00* | (2006.01) |
| *F16B 7/22* | (2006.01) |
| *A47F 7/024* | (2006.01) |
| *A47G 29/08* | (2006.01) |
| *F16B 45/02* | (2006.01) |

(58) Field of Classification Search
USPC .......... 206/6.1; 403/321, 322.1; 402/34, 36; 292/251.5; 24/303
See application file for complete search history.

(56) References Cited

U.S. PATENT DOCUMENTS

| | | | | |
|---|---|---|---|---|
| 594,420 A * | 11/1897 | Boble | ............ | B42F 13/24 402/34 |
| 808,248 A * | 12/1905 | Morden | ............ | B42F 13/16 402/27 |
| 1,195,156 A * | 8/1916 | Wheary | ............ | E05B 69/006 211/7 |
| 1,196,484 A * | 8/1916 | Russell | ............ | E05B 69/006 211/7 |
| 1,206,769 A * | 11/1916 | Wheary | ............ | E05B 69/006 211/7 |
| 1,218,103 A * | 3/1917 | Moffat | ............ | A47K 10/025 211/45 |
| 1,229,663 A * | 6/1917 | Schwartz | ............ | E05B 69/006 211/7 |
| 1,233,576 A * | 7/1917 | Higgins | ............ | E05B 69/006 16/15 |
| 1,242,849 A * | 10/1917 | Parris | ............ | A47G 25/0685 160/125 |
| 1,372,196 A * | 3/1921 | Roy | ............ | A47K 10/025 211/6 |
| 1,404,240 A * | 1/1922 | Shupe | ............ | A47K 10/025 211/45 |
| 1,692,679 A * | 11/1928 | McGoogan | ............ | A47F 7/30 211/123 |
| 1,696,579 A * | 12/1928 | Miller | ............ | A47B 61/003 182/179.1 |
| 1,769,737 A * | 7/1930 | De Witt | ............ | A47F 7/12 248/158 |
| 1,830,282 A * | 11/1931 | Lorch | ............ | A47B 61/003 160/351 |
| 2,017,248 A * | 10/1935 | Hondeville | ............ | A47K 10/42 211/124 |
| 2,054,007 A * | 9/1936 | Sihler | ............ | A47G 25/0664 211/123 |
| 2,287,418 A * | 6/1942 | Dudley | ............ | A47F 5/02 211/123 |
| 2,748,955 A * | 6/1956 | Anselmo | ............ | A47B 43/00 211/182 |
| 2,951,589 A * | 9/1960 | Dudley | ............ | A47F 7/12 211/59.1 |
| 2,956,767 A * | 10/1960 | Unetic | ............ | A47K 3/003 248/251 |
| 2,972,419 A * | 2/1961 | Zelen | ............ | A47G 25/16 211/113 |
| D190,552 S * | 6/1961 | Doucet | ............ | 211/123 |
| 3,659,721 A * | 5/1972 | Parillo | ............ | A47G 25/0692 211/7 |
| 3,785,740 A * | 1/1974 | Strong | ............ | B42F 13/18 402/29 |
| 3,853,225 A * | 12/1974 | Gegauff | ............ | A47G 25/746 211/124 |
| 3,871,526 A * | 3/1975 | Marsack | ............ | A47K 10/04 211/189 |
| 4,109,794 A * | 8/1978 | Samuel | ............ | A47G 25/746 211/100 |
| 4,336,885 A * | 6/1982 | Thomas | ............ | A47F 7/024 211/4 |
| D270,220 S * | 8/1983 | Cuminale | ............ | D6/682.4 |
| 4,462,497 A * | 7/1984 | Maule | ............ | A47F 5/04 211/59.1 |
| 4,474,300 A * | 10/1984 | Entis | ............ | A47F 5/0861 211/4 |
| 4,496,060 A * | 1/1985 | Anderson | ............ | B65D 85/185 206/279 |
| 4,762,238 A * | 8/1988 | Blanchard | ............ | A47G 25/0692 211/123 |
| 4,775,053 A * | 10/1988 | Geiger | ............ | A47F 7/02 211/85.2 |
| 4,811,853 A * | 3/1989 | Mead | ............ | B65D 85/185 206/279 |
| 4,854,456 A * | 8/1989 | Lee | ............ | A47B 81/007 211/123 |
| 4,934,015 A * | 6/1990 | Mink | ............ | A47L 4/04 15/268 |
| 5,018,627 A * | 5/1991 | Moore | ............ | A47F 7/24 206/291 |
| 5,181,685 A * | 1/1993 | Ostapowicz | ............ | A47G 25/0685 211/105.1 |
| D352,190 S * | 11/1994 | Tucker | ............ | D6/681.1 |
| 5,373,950 A * | 12/1994 | Marc | ............ | A47K 10/04 211/105.1 |
| 5,577,304 A * | 11/1996 | Simond | ............ | F16B 45/02 24/588.1 |
| 6,158,578 A * | 12/2000 | Greiner | ............ | A47F 5/10 206/6.1 |
| 6,223,915 B1 * | 5/2001 | Waner | ............ | A47F 7/19 211/124 |
| 6,976,596 B2 * | 12/2005 | Brooks | ............ | F24C 15/16 211/153 |
| D532,994 S * | 12/2006 | Rice | ............ | D6/682.6 |
| 7,249,679 B2 * | 7/2007 | Klein | ............ | A47F 7/08 211/175 |
| 7,600,645 B2 * | 10/2009 | Gregory | ............ | A47F 7/12 211/85.3 |
| 7,891,506 B2 * | 2/2011 | Kornowski | ............ | A45C 11/16 211/163 |
| 8,141,721 B2 * | 3/2012 | Harris-Bowman | ....... | A47F 7/03 206/6.1 |
| 8,720,705 B1 * | 5/2014 | Merbeth | ............ | A47G 1/12 211/100 |
| 9,763,529 B2 * | 9/2017 | Abebe | ............ | A47G 29/08 |
| 2002/0179546 A1 * | 12/2002 | McMurray | ............ | A47F 5/0861 211/4 |
| 2005/0194334 A1 * | 9/2005 | Johnson | ............ | A45D 8/36 211/85.2 |
| 2007/0023465 A1 * | 2/2007 | Huang | ............ | A47G 25/0614 223/85 |
| 2008/0185353 A1 * | 8/2008 | Immerman | ............ | A47K 10/04 211/16 |
| 2009/0158899 A1 * | 6/2009 | Eisenbraun | ............ | A45C 15/00 81/3.09 |
| 2009/0184073 A1 * | 7/2009 | Lu | ............ | A47B 61/003 211/85.3 |
| 2011/0175376 A1 * | 7/2011 | Whitens | ............ | B60R 7/06 292/251.5 |
| 2012/0285913 A1 * | 11/2012 | Taurins | ............ | A47G 25/74 211/85.3 |
| 2015/0257551 A1 * | 9/2015 | Trainor-Smith | .......... | A47F 7/02 211/85.2 |
| 2016/0235220 A1 * | 8/2016 | Abebe | ............ | A47G 29/08 |
| 2018/0000263 A1 * | 1/2018 | Abebe | ............ | A47F 5/0006 |

\* cited by examiner

ORGANIZER AND DISPLAY UNIT

CROSS REFERENCE TO RELATED APPLICATIONS

This application claims the priority of U.S. Ser. No. 15/043,557, inventor Tsigie Abebe, entitled "Rod-Type Organizer and Display Unit for Continuous Personal Items", filed on Feb. 2, 2016, now pending and the entire disclosure of which is hereby incorporated by reference thereto, in its entirety; which in turn claims the benefit of U.S. Provisional Application No. 62/115,835 filed on Feb. 13, 2015, inventor Tsigie Abebe, and the entire disclosure of this provisional patent application is hereby incorporated by reference thereto, in its entirety.

STATEMENT REGARDING FEDERALLY SPONSORED RESEARCH OR DEVELOPMENT

Not applicable.

FIELD OF THE INVENTION

The present invention relates to an Organizer and Display Unit for storing and displaying personal items or accessories, such as rings, bracelets, bangles, necklaces, watches and the like.

BACKGROUND OF THE INVENTION

It is a problem in the art to display personal items or accessories, such as rings, bracelets, bangles, necklaces, watches and the like. It is a particular problem to insert and remove such personal items from a display rod or rack, since such items are typically continuous, that is, they comprise continuous, closed circles or loops and cannot be opened or closed.

Personal items or accessories, such as rings, bracelets, bangles, necklaces, watches and the like are often difficult to store and retrieve. One of the most common ways to store and display these personal items involves slipping them over an open rod-like storage device, often a simple wooden peg with one free end and with the other end secured to a door. Another common method for storage of personal items is the classic jewelry chest. Many people accumulate large numbers of these personal items and convenient, safe storage is always something of a problem.

It is especially difficult to conveniently store bracelets or bangles (a rigid bracelet) in a jewelry chest as these items tend to be considerably larger than other personal items such as earrings, rings or even watches. In addition, bracelets and bangles are often of more delicate construction. Many if not most, bracelets, bangles, rings and watches are continuous—that is, they comprise continuous, closed circles or loops and cannot be opened or closed. This construction can cause problems when attempting to secure these items over a closed rod-type storage unit—that is, a rod-type storage unit which is closed at each end. Even personal items that can be opened and closed can be difficult to secure on a rod-type storage unit since many of these items tend to be rather delicate and fragile.

A wide variety of devices have been provided over the years to conveniently store and retrieve personal items. These range from simple pegs with an open or free end and with the other end secured to a convenient surface such as the back of a closet door. In addition cup hooks screwed into a board, wall or door and also quite common storage devices. And, of course, the classic jewelry chest has been used for centuries as a jewelry storage device. Pegs or rods have to be individually mounted to the desired surface. In addition, the personal items may easily be dislodged from the peg or rod. These same problems occur when using cup hooks for storage. In addition, these personal items are often fragile and can easily be damaged or destroyed by a metal cup hook It is also easy to dislodge a personal item from one cup hook when removing another personal item from an adjacent cup hook Jewelry chests can also be problematic in that it is difficult to store larger items such as bracelets, bangles and necklaces in a jewelry chest because of size restraints. It is not unusual to have a bracelet or bangle exceed 4 inches in diameter and an inch in width. In addition, bracelets and bangles are often made of very thin metal and, consequently rather fragile. The same could be said of earrings, since many of them are also rather large and delicate. The size of a personal item can make it difficult to conveniently store the personal items in the typical jewelry box. In addition, it is always difficult to avoid damaging larger personal items when opening and closing drawers and/or doors in a jewelry box.

It is often quite convenient to store bracelets, bangles, watches and rings on a rode-like storage device. If the rod is securely mounted at one end and free at the other, the bracelet, bangle, watch or ring may simple be slipped onto the free end of the rod for storage and then removed when desired. The rod-like storage device often has to be mounted at an angle or provided with an enlarged tip to keep the personal item on the rod-like storage device. In other words, such rods are often generally vertical or mounted at a significant angle to the horizontal such that gravity will assist in keeping the personal items on the rod-like storage device.

Various devices have been provided in the prior art to resolve these issues and provide for more convenient storage and retrieval of personal items. For example, U.S. Pat. No. 6,691,118 to Phillips discloses an accessory holding device for holding a plurality of accessory devices such as hair clips, bows, barrettes, ties and other hair accessories as well as various items of jewelry. The device comprises a plurality of rod-like members closed at both ends which provide storage for items which may be clipped onto the rod-like storage members. In addition, open-ended rods are provided for slip-on storage of continuous items such as bracelets, bangles and/or rings. Internal attachment members, drawers, and retainers are provided to accommodate a wide array of items. The device may be relatively open, formed only with a base and sides, or be enclosed with top, back, and face plates, in differing embodiments. The device may also be provided with a mounting device so that the entire device may be hung on the wall, the back of a door, or other surfaces. The Philips device does not provide for the rod-like storage members to open such that continuous items like bracelets, bangles, rings and watches may be easily mounted on and/or removed from the rod-like storage members.

U.S. Pat. No. 6,158,578 to Greiner discloses a jewelry holder with at least two movable and interchangeable stands and a base. The base may be in the form of a box with a slidable drawer in which a ring holder platform may be inserted. The base has a plurality of grooves to receive jewelry stands. The jewelry stands have various configurations to hold earrings, necklaces and bracelets. According to a third aspect of the invention there is provided a ring holder having a platform and a plurality of mounds integrally formed on the platform. The mounds have a shape that allows rings to be stored thereon. One embodiment of the Greiner jewelry holder provides open-ended rod-like storage members for storage of continuous items like bracelets, bangles, rings, or watches; however, the Greiner holder does not does not provide for the rod-like storage members to be closed at each end so that items mounted thereon cannot fall off the rod-like storage member. Nor does the Greiner holder provide for rod-like storage members which can be opened and closed such that continuous items like bracelets, bangles, rings and watches may be easily mounted on and/or removed from the rod-like storage members.

U.S. Pat. No. 7,891,506 to Komowski discloses a jewelry holder and display comprising an upstanding post the lower end of which is secured to a circular base which, in turn, is rotatably supported on a larger diameter primary base such that the upstanding stem can be readily rotated about its longitudinal axis. The stem supports radially located extending pegs and also supports at its upper end a generally cylindrical cap-shaped receptacle member having a plurality of radially extending pegs selectively secured to its outer circumference for supporting jewelry items such as bracelets, bangles, watches, necklaces, and the like. All of the Komowski rod-like support members are pegs mounted at one end and open at the other such that jewelry items can fall off the peg. The Komowski holder does not provide for rod-like storage members which can be opened and closed such that continuous items like bracelets, bangles, rings and watches may be easily mounted on and/or removed from the rod-like storage members.

U.S. Pat. No. 4,775,053 to Geiger discloses a jewelry rack or holder comprising a framework of attractive vertical and horizontal wooden bars. The horizontal bars are provided with hooks for hanging small items such as rings and necklaces. In one embodiment, the vertical bars are provided with small drilled holes for receiving the shafts of pierced-type earrings. In another embodiment, a block of plastic material covered with cloth is utilized to removably secure the shafts of pierced-type earrings. The jewelry rack may be hung from a wall or it may include removable stands for supporting it in an upright attitude on a horizontal surface. The Geiger jewelry rack does not provide for rod-like storage members which can be opened and closed such that continuous items like bracelets, bangles, rings and watches may be easily mounted on and/or removed from the rod-like storage members.

U.S. Pat. No. D270,220 to Cuminale discloses an ornamental design for a bracelet display stand. The Cuminale invention provides for a base with two horizontal rods mounted on supports extending upwards from the base. The rods are closed at each end and appear to be capable of supporting continuous jewelry items like bracelets or bangles. Since the Cuminale patent is a design patent, there is no written description of how the apparatus is made or intended to be used other than a very brief description of the drawings. There is simply no information provided in Cuminale as to how bracelets, bangles, etc are inserted onto the display stand.

SUMMARY Of THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides a device so display personal items or accessories, such as rings, bracelets, bangles, necklaces, watches and the like.

The device of the present invention provides a rod-like jewelry organizer, holder and/or display closed at each end to maintain the items on the holder/display unit. In its most basic form, the invention comprises two paired storage rods which are cantilevered to each end of an elongated mounting strip. The open end of each paired rod extends towards the middle of the elongated strip. A pivotable cover (in one embodiment) or a sliding cover (in another embodiment) is secured to one of the paired rods and permits the rods to be secured together into a single elongated rod when the cover is in the closed position. When the cover is in the open position, a gap exists between the paired rods permitting continuous items of jewelry to be slipped onto the storage rods. The invention will provide for convenient storage and retrieval of a large number of continuous items of jewelry such as bracelets, bangles, watches, necklaces, rings and the like. This is accomplished by providing a rod-like storage device which is closed at both ends of the rod so that items stored on the rod cannot fall off the rod, and providing the device with an opening means so that items can easily be slipped onto the rod once it has been opened. Although the invention is directed towards the storage and/or display of continuous personal items of jewelry it should be understood that the invention is equally useful for storing non-continuous personal items—items that can themselves be opened or closed. The invention may also be used for the storage and/or display of other items, for example rubber bands, O-rings or the like.

Other objects and advantages of the present invention will be more readily apparent from the following detailed description when read in conjunction with the accompanying drawings.

DETAILED DESCRIPTION OF THE INVENTION

Figure 1:
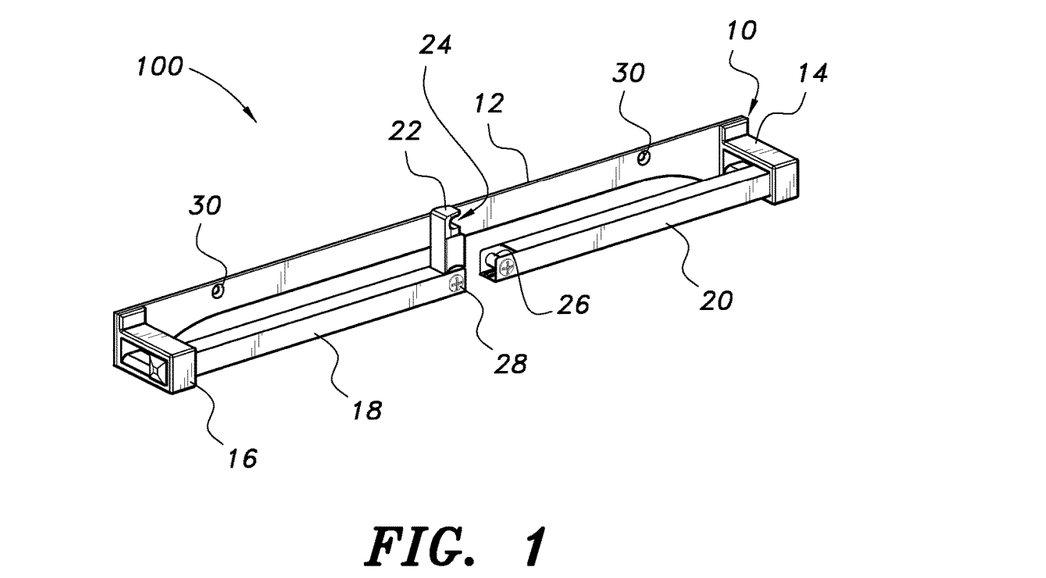
FIG. 1 is a perspective view of a wall mount organizer and display unit, according to the present invention, showing a movable locking device in an open position.

FIG. 1 is a perspective view of a wall mount organizer and display unit 100, showing a movable locking device 22 in an open position. The organizer and display unit 100 is intended to be used for supporting a number of items such as bracelets and bangles, and other types of continuous personal items, so that they can be organized and held in specific relative locations. That is, this invention allows the user to remove one specific bangle or bracelet or continuous item by sliding all of the adjacent items to right or left-side of the bar holding them and then be able to remove that specific item without removing any other item or multiple items. The items supported are moved by sliding along the supporting bar, such that the item to be removed is adjacent to the openable section (discussed below) and can be removed once that section has been opened.

Figure 2:
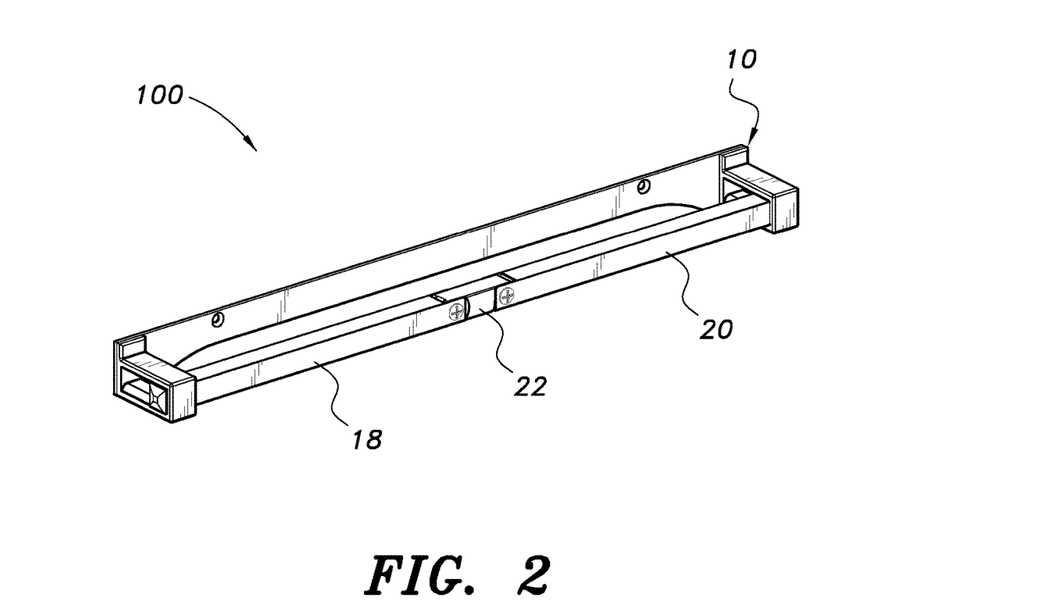
FIG. 2 is a perspective view of a wall mount organizer and display unit, according to the present invention, showing a movable locking device in a closed position.

FIG. 2 is a perspective view of a wall mount organizer and display unit 100, showing a movable locking device 22 in a closed position.

The storage device and organizer 100 is shown for storing a plurality of personal items. The device 100 includes a mounting member 12 having a facing side and a mounting side. The mounting member 12 has a first end and a second end, and is adapted to be mounted on a wall with the mounting side facing the wall. The device 100 also includes a first support member 16 connected to the first end of the mounting member 12, and that member 16 extends a predetermined distance from the facing side of the mounting mender 12 as shown in FIG. 1, and includes a second support member 14 connected to the second end of the mounting member 12, and this member 14 extends at a substantially same predetermined distance from the facing side of the mounting member 12.

The device 100 has a left storage beam portion having a first end and a second end, the first end of the left storage beam portion 18 being fixedly secured to the first support member 16, and the second end of the left storage beam portion 18 being free.

The device 100 has a right storage beam portion 20 having a first end and a second end, the first end of the right borage beam portion 20 being fixedly secured to the second support member 14, and the second end of the right storage beam portion 20 being free. The second end of the right storage beam portion 20 has a securing portion which is formed by a pin 26 disposed in a slot or recess (not numbered) in the second end of the right storage beam portion 20.

The device 100 has a movable locking device 22 having a first end and a second end, the first end of the movable locking device 22 being pivotably connected by a pivot device 28 to the second end of the left storage beam 18. The second end of the movable locking device 22 is adapted to be secured to the securing portion 26 of the second end of the right storage beam portion 20.

The movable locking device 22 having an open position (shown in FIG. 1) wherein the second end of the movable locking device 22, having the recess 24, is not secured to the right storage beam portion 20, for insertion and removal of items from the left storage beam portion 18 and the right storage beam portion 20.

The movable locking device 22 has a closed position (shown in FIG. 2) wherein the second end of the movable locking device 22 is secured to the securing portion 26 of the right storage beam portion 20. Once the movable locking device 22 in the closed position, it enables sliding movement of items between the left storage beam portion 18 and the right storage beam portion 20. Such items can include rings, necklaces, and other personal items capable of being supported on a beam including a rectangular beam or a circular beam.

The movable locking device 22 is manually movable by pivoting about a pivot member 28, such pivoting being relative to the second end of the left storage beam 18, the pivoting being between the open position and the closed position, for insertion and removal of items from the left storage beam portion 18 and the right storage beam portion 20. The pivot member 28 is preferably a pin or bolt which passes through the walls of the left storage beam portion 18, and wherein the free end of the left storage beam portion 18 has a recess (not shown) to receive a portion of the movable loosing device 22. The present invention is not limited to this embodiment, and can include any pivotable locking device which would be known to any one having skill in the mechanical construction and connecting arts.

The securing portion 26 on the second end of the right storage beam portion 20 includes a slot (unnumbered) adapted to receive the second end of the movable locking device 22. The securing portion 26 can be a pin disposed in the slot of the second end of the right storage beam portion, to engage the movable locking device 22 when in the closed position.

The left storage beam portion, as well as the right storage beam portion, can be respectively formed as an elongated body having a substantially rectangular prismatic shape, that is adapted to support bracelets and rings. The left storage beam portion, as well as the right storage beam portion, can be respectively formed as an elongated body having a substantially tubular shape having a substantially circular cross section. Other types of cross section can be used, for example hexagon, oval, triangular, and so on. All such cross sections which would be known to any one having skill in she mechanical construction arts are contemplated as being within the scope of the present invention.

The second end of the movable locking device 22 has a recess 24 adapted to receive the pin disposed in the slot of the second end of the right storage beam portion, to engage the movable locking device 22 with the pin 26 when in the closed position.

In a further embodiment, one of the pin 26 and second end of the movable locking device 22 has a portion composed of ferrous metal, the other one of the pin 26 and second end of the movable locking device has a portion which comprises a magnet; whereby the movable locking means is magnetically secured to the right storage beam portion when in the closed position.

Figure 3:
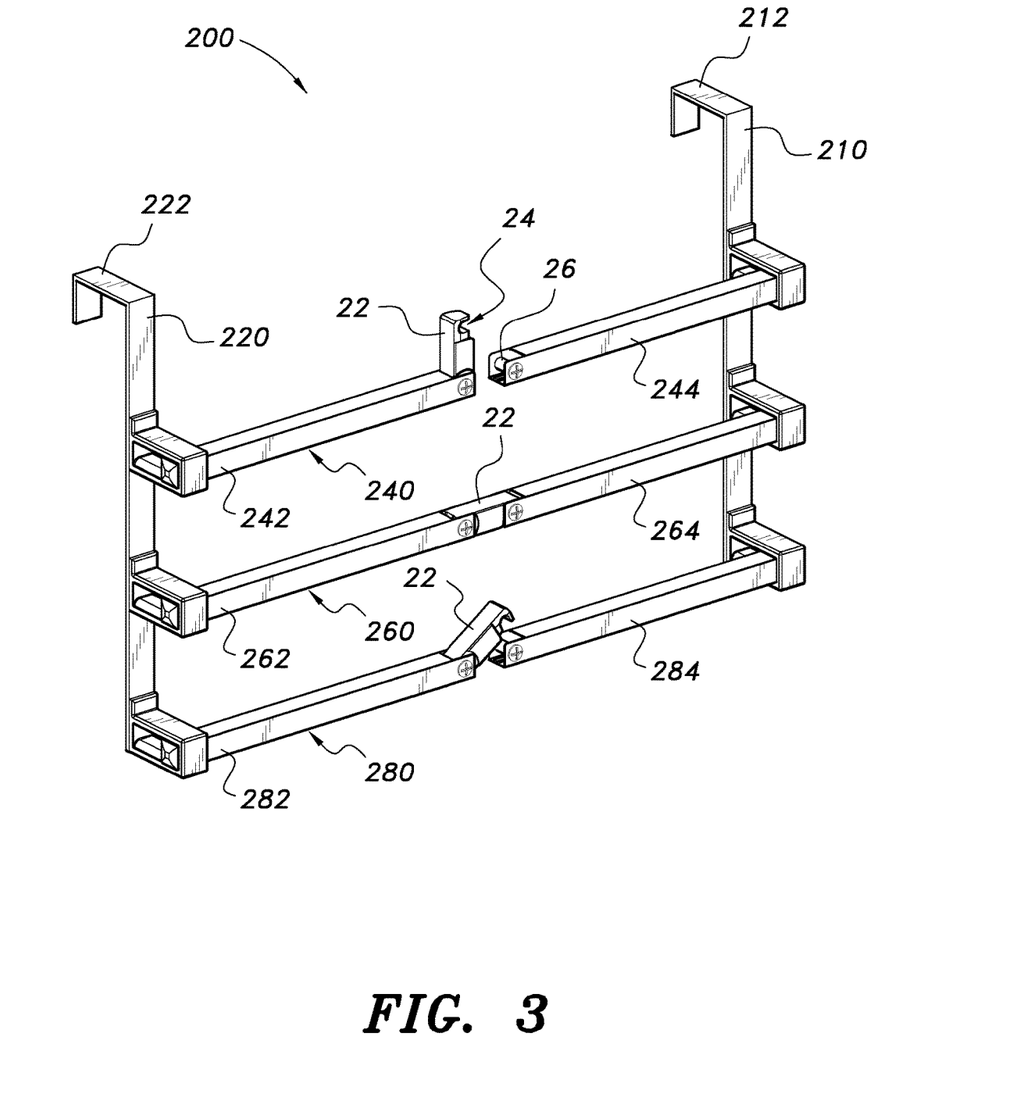
FIG. 3 shows an over the door rack that having a plurality of organizer racks, according to the present invention, showing respective movable locking devices in an open position, a closed position, and an intermediate position in which the movable locking device is partially open.

FIG. 3 shows a rack 200 having a plurality of organizer racks 240, 260, and 280, showing respective movable locking devices 22, 22, 22 in an open position, a closed position, and an intermediate position in which the movable locking device is partially open.

The rack 200 has an upper portion collectively serving as a mounting member having a facing side and a mounting side; and wherein the mounting member has a first end 222 and a second end 212, the first end 222 having an elongated mounting member 220 and the second end 212 having an elongated mounting member 210. The first end 222 has a first hook portion for mounting atop a door (not shown), and the second end having a second hook portion for mounting atop a door. The mounting members are adapted to be mounted on a door with the mounting side facing the door.

In FIG. 3, each of the plurality of organizer racks 240, 260, and 280 is substantially the same as that shown in FIGS. 1 and 2, and therefore the description thereof is referred with reference to this figure. Here, rack 240 has left and right storage beam portions 242 and 244 respectively; rack 260 has left and right storage beam portions 262 and 264 respectively; and rack 280 has left and right storage beam portions 282 and 284 respectively.

It is contemplated that the embodiment of FIG. 3 could encompass only one of the racks such as rack 240; or two of the racks such as racks 240 and 260; or can include additional racks (not shown) so that there are four or more such racks. All such variations are contemplated as being within the scope of the present invention.

Figure 4:
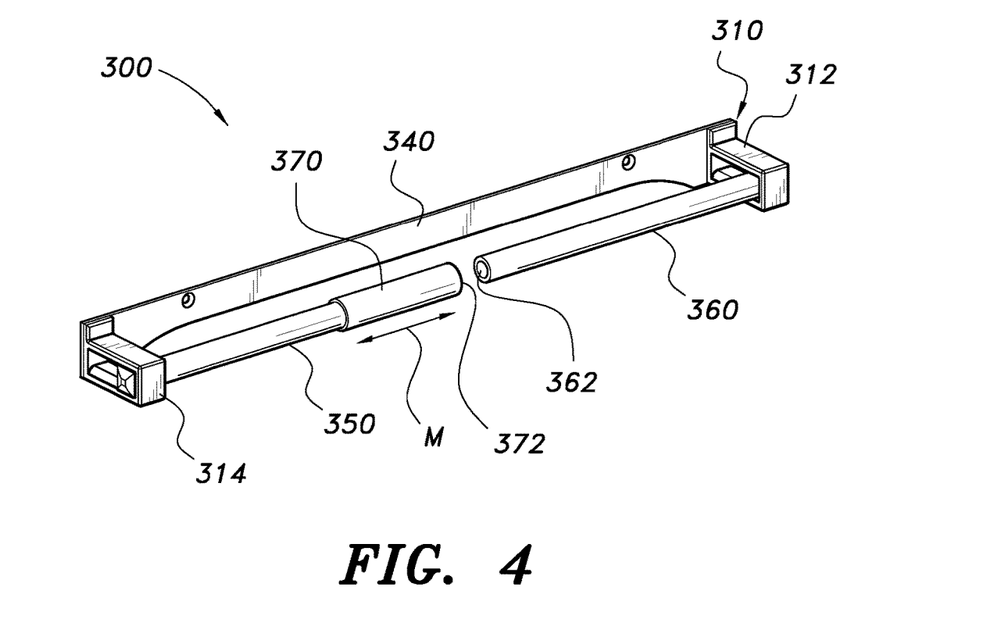
FIG. 4 is a wall mount perspective view of an organizer and display unit, according to the present invention, showing a slidable locking device in an open position.

FIG. 4 is a perspective view of an organizer and display unit 300, showing a slideable locking device 370 is an open position. The slideable locking device 370 has a first end (unnumbered) and a second end 372, and can move in the directions indicated by the double-headed arrow M in FIG. 4. The unit 300 has a mounting member 340, a body 310, and support member 312, and a first storage beam post ion 350 and a second storage beam portion 360. The structures herein which are similar to those of the preceding figures are not explained in detail and reference is made to the foregoing discussion.

Here, there are circular cross sections for the first storage beam portion 350 and the second storage beam portion 360. Other types of cross section can be used, as explained in the foregoing with reference to the preceding figures.

The slidable locking device 370 is preferably a tubular member as shown, which is slideable in the directions indicated by the double-headed arrow M. The slideable locking device 370 can be spring biased in a known type of manner for slideable elements or telescoping elements, or it can be free. Limiting elements such as stops (not shows) can likewise be provided, and such features and variations are contemplated as being within the scope of the present invention.

Furthermore, a magnet can be provided one of the slideable locking device 370 and the free end of the second storage beam portion 360, in which the other one of the slideable locking device 370 and the free end of the second storage beam portion 360 is composed of ferrous material, whereby the movable locking device 370 is magnetically secured to said right storage beam portion 360 when in said closed position.

Figure 5:
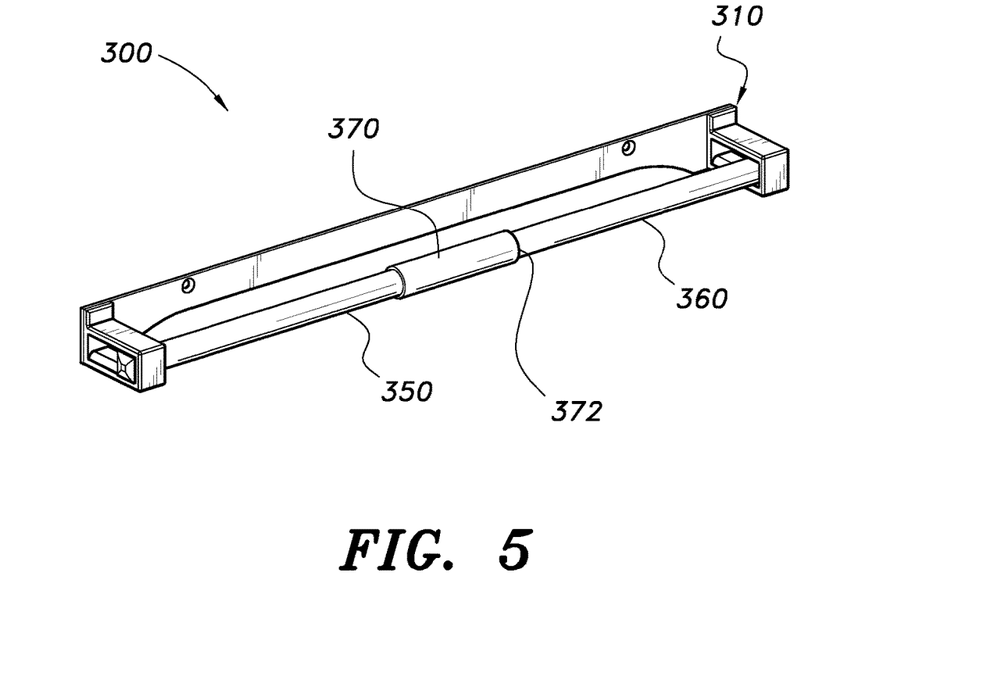
FIG. 5 is a perspective view of a wall mount organizer and display unit, according to the present invention, showing a slidable locking device in a closed position.

FIG. 5 is a perspective view of an organizer and display unit, showing a slideable locking device 370 (also referred to herein as the movable locking device 370) in a closed position.

Figure 6:
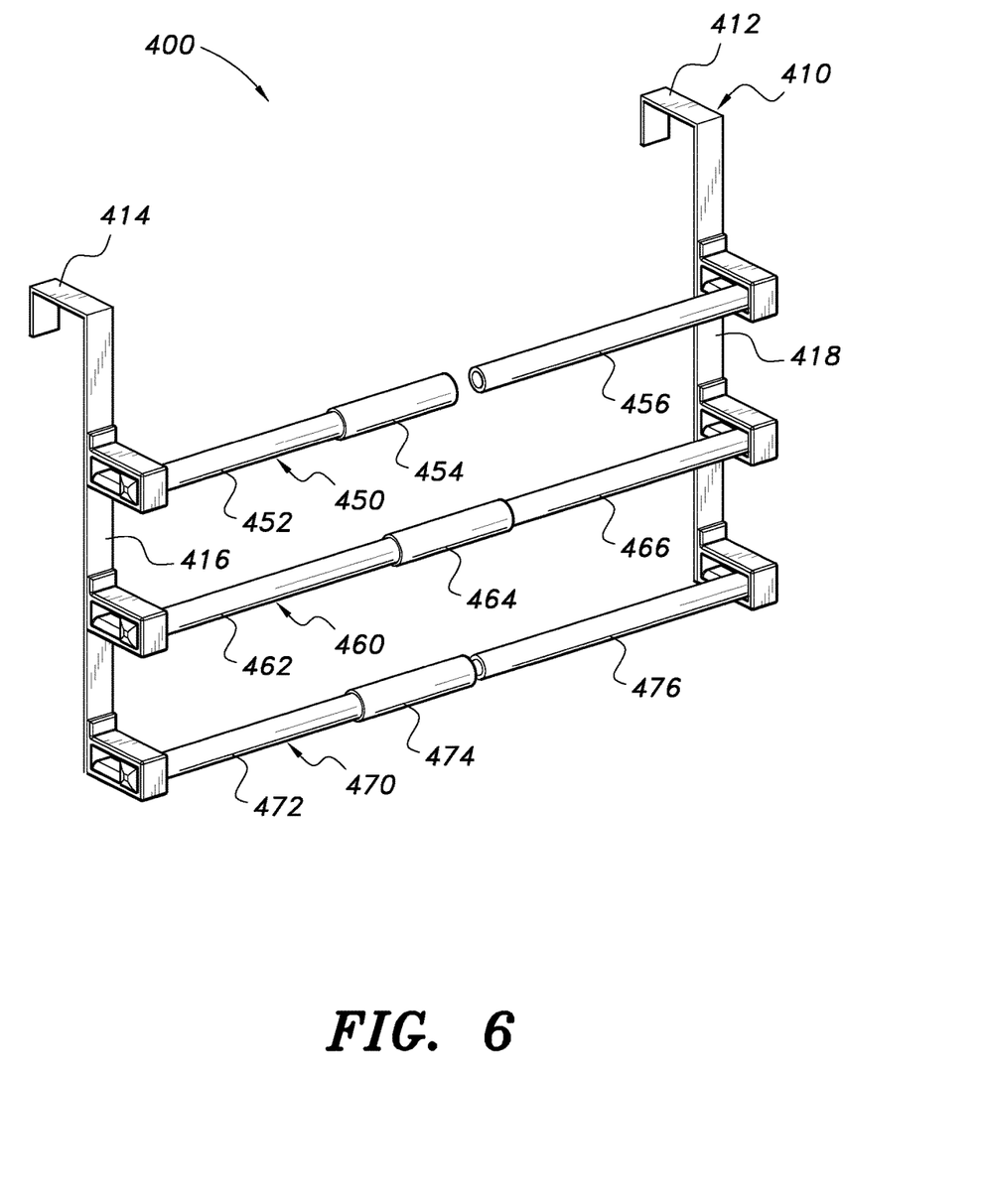
FIG. 6 shows an over the door rack having a plurality of organizer racks, according to the present invention, showing respective slidable locking devices in an open position, a closed position, and an intermediate position in which the slidable locking device is partially open.

FIG. 6 shows a rack 400 having a body 410 which supports a plurality of organizer racks 450, 460, and 470, and shows respective movable locking devices 454, 464, and 474 in an open position, a closed position, and in an intermediate position in which the movable locking device 474 is partially open. The respective movable locking devices 454, 464, and 474 are substantially the same as that shown in FIGS. 4 and 5, and therefore reference is made to the foregoing discussion with respect to those figures.

The rack 400 has an upper portion collectively serving as a mounting member having a facing side and a mounting side; and wherein the mounting member has a first end 414 and a second end 412, the first end 414 having an elongated mounting member (unnumbered) and the second end 412 having an elongated mounting member (unnumbered) extending vertically downward for supporting the plurality of organizer racks 450, 460, and 470. The first end 414 has a first hook portion for mounting atop a door (not shown), and the second end 412 having a second hook portion for mounting atop a door. The mounting members are adapted to be mounted on a door with the mounting side facing the door.

In FIG. 6, each of the plurality of organizer racks 450, 460, and 470 is substantially the same as that shown in FIGS. 4 and 5, and therefore the description thereof is not repeated herein with reference to this figure. Here, the rack 450 has left and right storage beam portions 452 and 456 respectively; the rack 460 has left and right storage beam portions 462 and 464 respectively; and the rack 40 has left and right storage beam portions 472 and 476 respectively.

It is contemplated that the embodiment of FIG. 6 could encompass only one of the racks such as rack 450; or two of the racks such as racks 450 and 460; or can include additional racks (not shown) so that there are four or more such racks. All such variations are contemplated as being within the scope of the present invention.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. A storage device and organizer for storing a plurality of personal items, comprising:
    a mounting member having a facing side and a mounting side; said mounting member having a first end and a second end, said first end having an elongated mounting member and said second end having an elongated mounting member, and first end having a first hook portion for mounting atop a door, and said second end having a second hook portion for mounting atop the door, and said mounting member being adapted to be mounted on the door with said mounting side facing the door;
    and a plurality of mounting units arranged vertically in spaced relation along said elongated mounting member of said first end and said elongated mounting member of said second end; wherein each of said plurality of mounting units comprises:
    a first support member connected to said first end of said mounting member, and extending a predetermined distance from said facing side of said mounting member;
    a second support member connected to said second end of said mounting member, and extending a predetermined distance from said facing side of said mounting member;
    a left storage beam portion having a first end and a second end, said first end of said left storage beam portion being fixedly secured to said first support member, and said second end of said left storage beam portion being free;
    a right storage beam portion having a first end and a second end, said first end of said right storage beam portion being fixedly secured to said second support member, and said second end of said right storage beam portion being free;
    said second end of said right storage beam portion having a securing portion;
    a movable locking device having a first end and a second end, said first end of said movable locking device being pivotably connected to said second end of said left storage beam; said second end of said movable locking device being adapted to be secured to said securing portion of said second end of said right storage beam portion;
    said movable locking device can be disposed in an open position wherein said second end of said movable locking device is not secured to said right storage beam portion, for insertion and removal of items from said left storage beam portion and said right storage beam portion;
    said movable locking device can be disposed in a closed position wherein said second end of said movable locking device is secured to said securing portion of said right storage beam portion, enabling sliding movement of items between said left storage beam portion and said right storage beam portion;

said movable locking device being manually movable by pivoting relative to said second end of said left storage beam between said open position and said closed position, for insertion and removal of items from said left storage beam portion and said right storage beam portion.

2. The storage device of claim 1, wherein said left storage beam portion has a substantially rectangular prismatic shape, and is adapted to support bracelets and rings.

3. The storage device of claim 2, wherein said right storage beam portion has a substantially rectangular prismatic shape, and is adapted to support bracelets and rings.

4. The storage device of claim 3, wherein one of said second storage beam portion and said second end of said movable locking device has a portion composed of ferrous metal, and the other one of said second storage beam portion and said second end of said movable locking device has a portion which comprises a magnet; whereby said movable locking device is magnetically secured to said right storage beam portion when in said closed position.

5. The storage device of claim 1, wherein said left storage beam portion has a substantially tubular shape having a circular cross section, and is adapted to support bracelets and rings.

6. The storage device of claim 1, wherein said right storage beam portion has a substantially tubular shape having a circular cross section, and is adapted to support bracelets and rings.

* * * * *